Aug. 29, 1950 E. E. ELDREDGE 2,520,308

FREQUENCY SHIFT CONVERTER

Filed Feb. 20, 1947 2 Sheets-Sheet 1

INVENTOR.
EARLE E. ELDREDGE
BY
Russell & Squire
ATTORNEYS

FREQUENCY SHIFT CONVERTER

Filed Feb. 20, 1947 2 Sheets-Sheet 2

INVENTOR.
EARLE E. ELDREDGE
BY
E. M. Squire
ATTORNEY

Patented Aug. 29, 1950

2,520,308

UNITED STATES PATENT OFFICE 2,520,308

FREQUENCY SHIFT CONVERTER

Earle E. Eldredge, Westbury, N. Y., assignor to Erco Radio Laboratories, Inc., Hempstead, N. Y., a corporation of New York Application February 20, 1947, Serial No. 729,854

4 Claims. (Cl. 178—88)

The present invention relates to frequency shift carrier current telegraphy and more particularly to converters for such systems which convert the two carrier frequencies used for the mark and space signals into direct current or other suitable indicia for use with telegraphic terminal apparatus.

An object of the invention is to provide a converter in which drift of the incoming frequencies may be readily detected.

A further object of the invention is to provide such a device in which the amount of such drift may be readily measured and in which the amount of frequency shift between the mark and space signals may likewise be readily measured.

In accordance with a feature of the invention, one of the two frequencies is suppressed by means of an adjustable rejection filter, permitting the other frequency to pass through the apparatus. The suppression of a single frequency permits the use of a filter which comprises as circuit elements only resistance and capacitance. These elements are commercially available at low cost, they are compact in their physical dimensions and are extremely stable with respect to both time and temperature in their electrical characteristics.

From another aspect, because the separation of the mark and space frequencies involves only the rejection of one of these two frequencies, thus permitting the use of a filter containing only resistive and capacitative circuits elements, the resistive elements may be made adjustable with an excellent degree of precision in setting. Moreover, if desired, suitable indicating means may be provided in conjunction with the adjustable resistors and calibrated in terms of the frequency rejected. This calibration will remain stable and the frequency measuring device thus obtained will be economical in cost and light and compact in comparison to a device employing suitable calibrated standard inductors, standard capacitors or similar precision elements.

Another feature of the invention permits monitoring of the incoming signals and manual adjustment of the rejection filter to obtain the maximum degree of rejection. Having determined this setting, the frequency rejected may be measured by reference to the calibrated dial of the rejection filter. By rejecting first one frequency and then the other and noting the corresponding settings of the calibrated dial, the amount of frequency shift may be readily measured, and corrections may then be made at the transmitting apparatus, if required.

Other and further objects will become apparent upon reading the following specification together with the accompanying drawings forming a part hereof, in which Fig. 1 is a schematic circuit diagram of an embodiment of the invention.

Figures 1, 2:
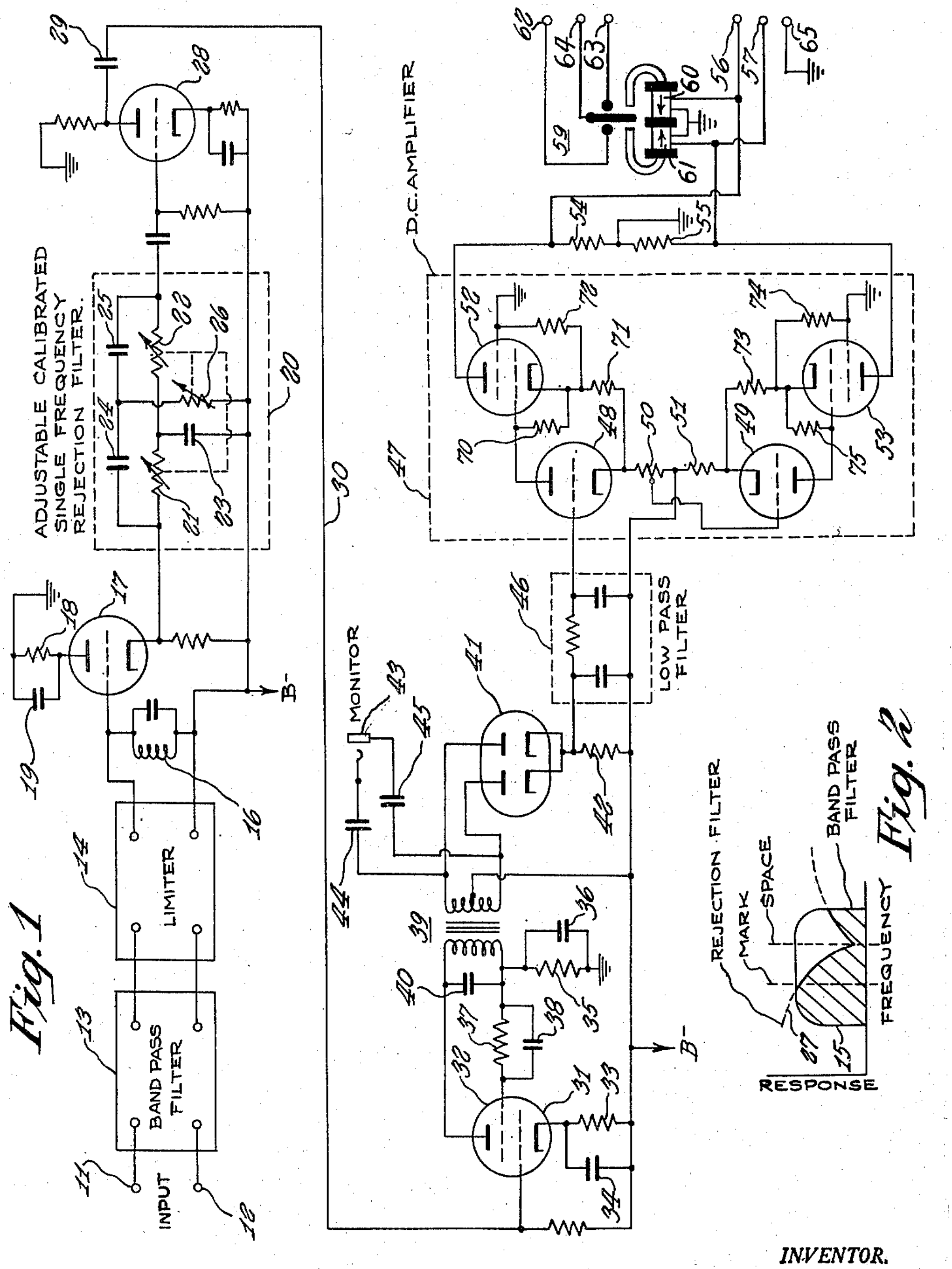
Fig. 2 shows the frequency response characteristics of certain filters of Fig. 1.

Referring to Fig. 1, input terminals 11 and 12 are adapted for connection to the output of a radio receiver or to some other source of signals in which an output is always present. This output shifts in frequency between two relatively fixed frequencies in accordance with the telegraphic mark and space signals.

Terminals 11 and 12 are connected through a band-pass filter 13 of suitable impedance characteristics to the input of a limiter 14. The response characteristics of filter 13 are shown in Fig. 2, being represented therein by curve 15. The width of the pass-band is sufficient to embrace the maximum amount of frequency shift with which the apparatus is intended to be utilized. The sharpness of cut-off at the extremes of the pass-band is preferably as great as may be obtained within the limits of good commercial practice. Sufficient damping should be included in filter 13, however, to permit the filter to respond to the shifting frequency at the keying speeds utilized without producing distortion by any tendency to sustain oscillations.

Limiter 14, to which the signals from filter 13 are applied may be of any conventional type, and its characteristics are such that it removes amplitude variations from the signals applied to its input. The response time of the limiter should preferably be as rapid as good commercial design will permit in order to remove transient disturbances. Under favorable circumstances, the limiter will be operating with constant amplitude input because either the mark signal or the space signal will always be present, the only difference between the two being in their respective frequencies rather than in their amplitudes. The limiter, of course must give substantially uniform operation at frequencies within the pass-band range of filter 13. Limiters having these characteristics are well known, such as the grid current type for example, and the limiter therefore is not shown in detail.

In passing through the limiter 14, the signals may be modified in wave shape by having the peaks of the waves clipped. This produces an output resembling the output of a square wave generator and which is relatively high in harmonic content. Another band pass filter similar to filter 13 may be used or a low-pass filter may be used to remove these harmonics, but it has been found to be sufficient in practice to use a simple tuned circuit such as the parallel inductance and capacitance combination 16. This combination should have its resonant point near the center frequency of the pass-band of filter 13 and should be fairly broadly tuned to avoid undue sharpness of response at any frequency within this band.

After removal of the harmonics, the signals are applied to the grid of triode 17 which is connected as a cathode follower. In order that output of the apparatus may have a relatively low potential with respect to ground, the anode supply has its positive terminal grounded and the negative terminal has been designated as B—. The anode is connected to ground through a suitable dropping resistor 18 which is shunted by a by-pass capacitor 19. Resistor 18 serves to reduce the anode voltage to a suitable value. The output of cathode follower 17 is applied to the input of a frequency rejection filter 20. The cathode follower 17 serves to reduce the impedance at the output of this stage to a value suitable for use with the input impedance of rejection filter 20. Although rejection filter 20 may take any convenient form, it has been shown as a double T impedance network comprising in one of the T's the series resistors 21 and 22 with shunt capacitor 23 and in the other T, series capacitors 24 and 25 with shunt resistor 26. The circuit constants are preferably somewhat asymmetrical and so proportioned as to obtain a frequency response characteristic having a sharp notch substantially as shown in Fig. 2 by curve 27.

Figures 3, 4:
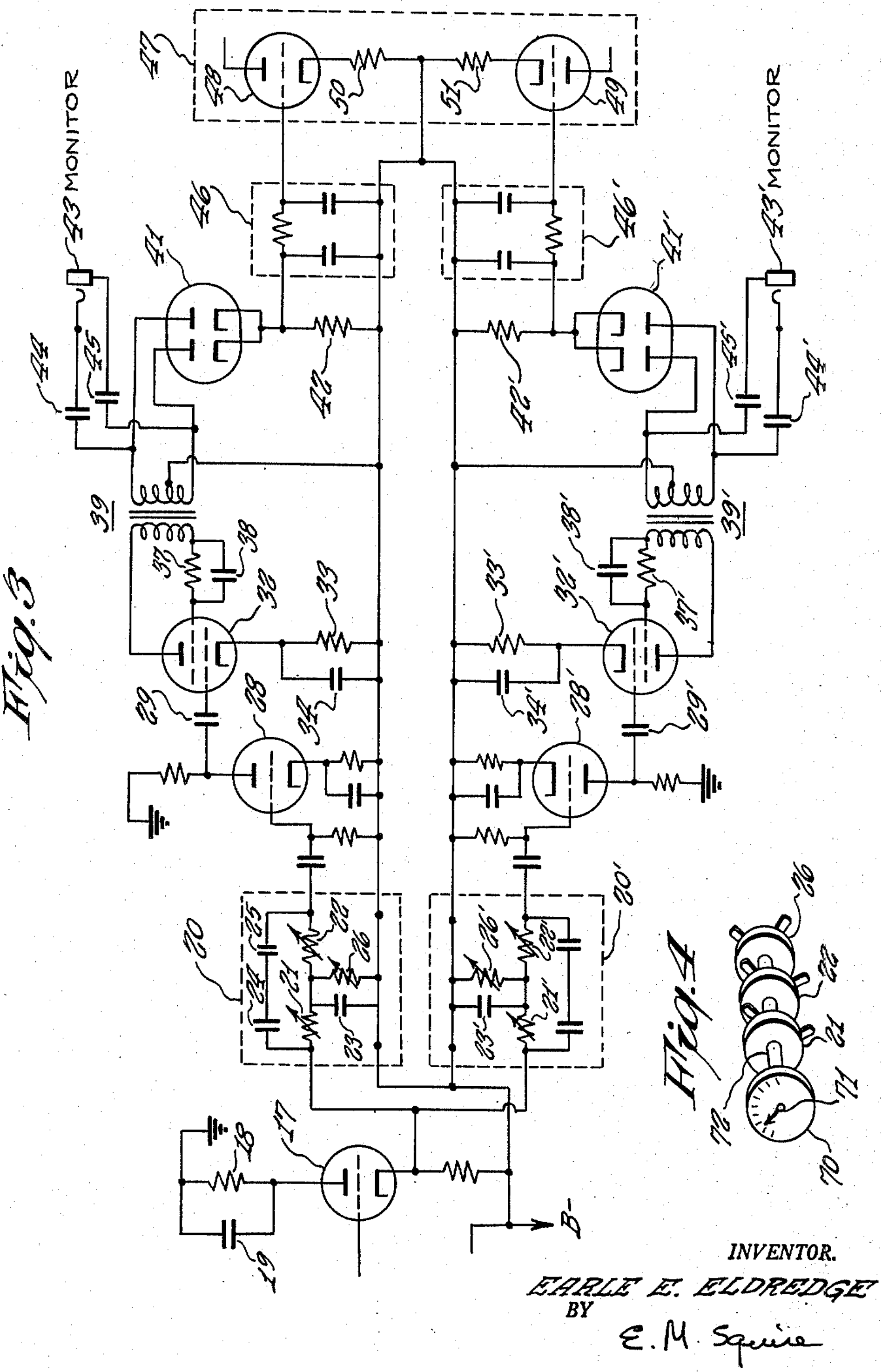
Fig. 3 is a fragmentary schematic circuit diagram showing a modified form of the invention.
Fig. 4 is a diagrammatic perspective view of the variable resistance elements of an adjustable filter.

For simplicity and compactness of mechanical design, it is preferable to make the resistors 21, 22 and 26 adjustable rather than to make the capacitors adjustable. These resistors are also preferably so designed that they may be operated by a common shaft 72 as indicated in Fig. 4 and by the dotted line in Fig. 1 joining the arrows which indicate their adjustability. With such an arrangement, the correct relative resistance values may be maintained over a range of settings, and the common operating shaft 72 for the three variable resistors may be provided with a calibrated dial 70 and pointer 71 which in turn may be calibrated to read directly the value of the frequency rejected. With an arrangement of this type where only a single frequency is rejected with a relatively high degree of selectivity as indicated by the notch-shaped response characteristic 27 of Fig. 2, it is important that harmonics generated in the limiter 14 be removed by the tuned circuit 16 to an extent sufficient for proper operation of the apparatus. Filters of this character require a substantially sinusoidal wave shape for effective rejection.

From the output of rejection filter 20, the non-rejected frequency, which is preferably the mark frequency, passes through triode 28 which is connected as a conventional resistance-coupled amplifier, and which serves to offset the attenuation produced by filter 20.

From the output of triode 28, the mark frequency passes through coupling capacitor 29 and along conductor 30 to the control grid of tetrode 32 the output of which is connected as a transformer coupled amplifier. Grid bias is provided by cathode resistor 33 and its associated by-pass capacitor 34. Anode potential is derived through dropping resistor 35 and its associated by-pass capacitor 36. The screen potential is obtained by the further action of dropping resistor 37 and its associated by-pass capacitor 38. Anode potential is applied through the primary winding of output transformer 39. A small capacitor 40 is connected across the primary winding of transformer 39 in order to reduce any possible tendency toward oscillation, particularly at higher frequencies.

The amplified mark frequency is rectified by the action of twin diode 41 which is shown connected as a full-wave rectifier. Resistor 42 serves as a load resistor for this diode.

A monitoring jack 43 is connected across the secondary winding of transformer 39 through coupling capacitors 44 and 45. This monitoring jack is for use with a headset or other suitable apparatus as described below.

The rectified mark signals derived from diode load resistor 42 are passed through a low-pass filter 46. This is shown as a resistance-capacitance type of filter which is ordinarily the most economical to construct and for this reason is considered to be preferable although any other desired form of construction may be used. The time constants of the filter are selected to give cut-off action at frequencies appreciably above the components of the maximum keying speed. The cut-off frequency is selected, however, to be sufficiently high so that no appreciable distortion is introduced in the rectified signals.

The amplifier 47 is more fully described in the copending application of Thomas E. Goodwin, Serial No. 748,608, filed May 16, 1947, now Patent No. 2,516,201, patented July 25, 1950. The trigger amplifier in itself forms a part of the present invention only in combination with the other features herein described.

The signals passed by filter 46 are applied to the input of a direct current trigger type amplifier 47. The amplifier shown has been found to be suitable, but any other convenient form of amplifier may be used if desired.

The input is applied directly to the control grid of triode 48. The biasing potential applied to the cathode of triode 48 by current flowing through the series arrangement comprising resistors 72, 71 and 50 is sufficient to maintain the plate current substantially at zero. Because of the cut-off condition of triode 48, the voltage drop across resistor 70 is negligible and, accordingly, the control grid of tetrode 52 is maintained at substantially the same potential as its cathode. This low grid bias on tetrode 52 causes it to draw a relatively heavy plate current which in turn flows through resistor 50 and helps to maintain the cut-off condition of triode 48. Triode 48 is preferably of the high amplification low plate current type.

Upon receipt of a mark signal, which passes through rejection filter 20 and reaches diode 41, a positive potential is produced which is applied to the grid of triode 48. This potential is sufficient in magnitude to cause triode 48 to draw an appreciable current which flows through resistor 70. The drop across resistor 70 places a corresponding negative bias on the control grid of tetrode 52 and reduces its normal plate current. This reduction in turn reduces the current flow through resistor 50 to a somewhat greater extent than the increase in current flow through this resistor occasioned by the current now being drawn by triode 48. The net decrease in current flow through resistor 50 has reduced the grid bias of triode 48, thus aiding the applied positive potential derived from the mark signal. The circuit constants must be so proportioned, however, that grid of triode 48 maintains control thus assuring a positive return to the cut-off condition in triode 48 as soon as the positive potential derived from the mark signal is reduced. As soon as this reduction commences, the plate current of triode 48 decreases with a resulting decrease in the bias of the control grid of tetrode 52 and a corresponding increase in voltage drop across resistor 50. Preferably, the resistors and tube characteristics are so selected that a sharp trigger action is obtained between triode 48 and tetrode 52, the circuit switching substantially instantaneously from a cut-off condition in one tube and a conductive condition in the other to a conductive condition in the first tube and a cut-off condition in the latter. By suitable design, a sharp clean cut response may be obtained with relatively small changes in input voltage applied to the grid of triode 48.

The lower half of the amplifier or trigger circuit comprising triode 49, tetrode 53 and resistors 51, 73, 74 and 75 is substantially identical with the upper half previously described. The input however is derived from a tap on resistor 50 which is so selected that with triode 48 cut-off during the absence of a mark signal, a sufficient positive potential will be applied to the grid of triode 49 to maintain this tube in a conducting condition and to maintain tetrode 53 in a substantially cut-off condition. Upon response to a mark signal, the drop across resistor 50 decreases to an extent sufficient to produce cut-off of triode 49 and an accompanying conductive condition in tetrode 53. During the space signal, these conditions are reversed.

During the space signal an output appears across resistor 54 as a result of current flow through tetrode 52. Upon receipt of a mark signal, tetrode 52 cuts off and current flows through tetrode 53 producing an output across resistor 55.

A polarized relay 59, may be of any conventional construction suitable for use at the telegraphic keying speeds to be utilized. This relay is provided with two windings 61 and 60 which are energized by the mark and space signals respectively, being joined together and to ground and being connected in the opposite sense of polarity to the respective outputs of pentodes 53 and 52 of the direct current trigger amplifier 47.

Preferably, the polarized relay 59 is removably mounted in the apparatus. This permits an increased output to be derived from terminals 56 and 57, if desired, by removal of the relay. Any other suitable means may be utilized to disconnect the windings 60 and 61 of relay 59 from the circuit, when external signaling apparatus is directly actuated by amplifier 47. The contacts of relay 59 are wired to terminals 62, 63 and 64 where they may be utilized to control telegraphic terminal apparatus, as desired. If the terminal apparatus includes a source of current to be controlled by contacts then terminals 62, 63 and 64 are used. If, on the other hand, it includes a polarized control magnet, then terminals 56 and 57 are to be used, and relay 59 removed from the circuit. If the terminal apparatus is non-polarized and is controlled by a magnet without a source of energy, then either terminal 57 and ground terminal 65 are used for response to the mark signal, or terminal 56 and ground terminal 65 are used for response to the space signal.

In operation, a monitoring device such as a pair of head phones or a visual indicating device such as a cathode ray oscilloscope may be plugged in to monitoring jack 43. The rejection filter 20 may then be tuned first to the mark frequency and then to the space frequency and the amount of shift read from the calibrated dial 70 on the filter. For use, it is then set to give the maximum elimination of the space frequency, and because of the sharply notched response curve, any drift in the incoming space frequency can be readily detected. In addition, the amount of the drift can be measured by retuning the rejection filter and noting the new frequency from the calibrated dial 70.

A single channel has been shown from the rejection filter 20 to the trigger-amplifier 47, the space signal being rendered ineffective in this channel and being artificially re-created by using the varying voltage drop across resistor 50. This is the simplest embodiment of my invention, and the simplicity is made possible by the use of the rejection filter 20. It is possible however, to obtain some improvement, amounting perhaps to about one or two decibels, by using two separate channels from triode 17 to the output tetrodes. Such an arrangement is shown in Fig. 3. The output of cathode follower 17 feeds two rejection filters 20 and 20', one for the mark frequency and the other for the space frequency. These outputs are individually amplified by separate triodes 28 and 28' and two separate circuits are provided, one containing instrumentalities 32, 39, 43, 41 and 46 and the other containing corresponding instrumentalities 32', 39', 43', 41' and 46' together with their associated circuit elements. At trigger amplifier 47, the grid lead of triode 49, instead of being connected to a tap on resistor 50, is connected to the output of its individual low pass filter 46' similar to filter 46 in the same manner as triode 48. The outputs of tetrodes 52 and 53 remain unchanged, however.

Using this modified arrangement, the two rejection filters may be adjusted individually and both mark and space frequencies may be noted by observation of the two calibrated settings at all times. This modification may be readily made by a person skilled in the art and has therefore not been shown in the drawings.

I have shown what I believe to be the best embodiments of my invention. I do not wish to be limited by the specific embodiment shown but by the invention as set forth in the appended claims.

I claim:

1. In a converter for use in telegraph terminal apparatus for separating the mark and space signals employed in frequency shift carrier current telegraphy the combination of: a band pass filter adapted to pass both the mark and space signal frequencies, a limiter operatively associated with the output of said band pass filter for maintaining the intensity of said signal frequencies at a substantially constant level, an impedance network connected to said limiter to reject one of said signal frequencies, rectifying means connected to said impedance network, said last means being responsive predominantly to the signal frequency least affected by the operation of said impedance network and direct current amplifying means connected to said rectifying means to produce an output suitable for telegraphic utilization apparatus.

2. In a converter for use in telegraph terminal apparatus for separating the mark and space signals employed in frequency shift carrier current telegraphy the combination of: a band pass filter adapted to pass both said frequencies, a limiter operatively associated with the output of said band pass filter for maintaining the intensity of said signal frequencies at a substantially constant level, an impedance network responsive to the output of said limiter and adapted to reject one of said signal frequencies, rectifying means responsive predominantly to the signal frequency affected to a lesser extent by the operation of said impedance network, a low pass filter responsive to said rectifying means for eliminating frequencies above the component frequencies of the signal frequency required to be passed by said filter to prevent distortion of the rectified signals, direct current amplifying apparatus responsive to the output of said low pass filter and connected to produce an output suitable for telegraphic utilization apparatus.

3. In a converter for use in telegraph terminal apparatus for separating the mark and space signals employed in frequency shift carrier current telegraphy the combination of: a band pass filter adapted to pass both said frequencies, a limiter operatively associated with the output of said band pass filter for maintaining the intensity of said signal frequencies at a substantially constant level, a pair of impedance networks each adapted to reject one of said signal frequencies, individual rectifying means associated with each of said impedance networks and responsive predominantly to the frequency least affected by the operation of its associated one of said impedance networks, direct current amplifying means each responsive to one of said rectifying means, and circuit means connected to combine the outputs of said amplifying means and to produce an output suitable for telegraphic utilization apparatus.

4. In a converter for use in telegraph terminal apparatus for separating the mark and space signals employed in frequency shift carrier current telegraphy the combination of: impedance network means for rejecting either the mark or the space signal frequency, rectifying means responsive predominantly to the frequency least affected by the operation of said impedance network means, amplifying means associated with said rectifying means and connected to produce an output in the absence of either signal frequency and further amplifying means operatively associated with the first-named amplifying means and connected to produce an output in response to a condition which produces a reduction in the output of the first-named amplifying means.

EARLE E. ELDREDGE.

REFERENCES CITED

The following references are of record in the file of this patent:

UNITED STATES PATENTS

| Number | Name | Date |
|---|---|---|
| 1,571,005 | Hartley | Jan. 26, 1926 |
| 1,791,578 | Singer | Feb. 10, 1931 |
| 2,164,745 | Kentner | July 4, 1939 |
| 2,211,750 | Humby | Aug. 20, 1940 |
| 2,312,145 | Bradley | Feb. 23, 1943 |
| 2,373,495 | Olsen | Apr. 10, 1945 |
| 2,384,456 | Davey | Aug. 11, 1945 |
| 2,446,077 | Crosby | July 27, 1948 |
| 2,463,402 | Maki | Mar. 1, 1949 |

FOREIGN PATENTS

| Number | Country | Date |
|---|---|---|
| 526,680 | Great Britain | Sept. 24, 1940 |

OTHER REFERENCES

Reprint Proc. IRE, Sept. 1946, vol. 34, No. 9.